US010949993B2

(12) United States Patent
Xue et al.

(10) Patent No.: US 10,949,993 B2
(45) Date of Patent: Mar. 16, 2021

(54) PUPIL LOCALIZATION METHOD AND DEVICE, APPARATUS, AND STORAGE MEDIUM (71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Hongzhen Xue, Beijing (CN); Jiyang Shao, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 174 days.

(21) Appl. No.: 16/156,495

(22) Filed: Oct. 10, 2018

(65) Prior Publication Data
US 2019/0206079 A1 Jul. 4, 2019

(30) Foreign Application Priority Data

Jan. 2, 2018 (CN) .......................... 201810001231.2

(51) Int. Cl.
G06K 9/00 (2006.01)
G06T 7/73 (2017.01)
(Continued)

(52) U.S. Cl.
CPC .............. G06T 7/73 (2017.01); G06K 9/0061 (2013.01); G06K 9/38 (2013.01); G06K 9/40 (2013.01);
(Continued)

(58) Field of Classification Search
CPC .................... G06F 3/013; G06T 11/00; G06T 2207/30041; G06T 7/11; G06T 2207/20068; G06K 9/4604; B60R 9/0061
See application file for complete search history.

(56) References Cited

U.S. PATENT DOCUMENTS 5,471,542 A * 11/1995 Ragland ................ A61B 3/113
351/208
5,481,622 A * 1/1996 Gerhardt ............... A61B 3/113
345/158
(Continued)

FOREIGN PATENT DOCUMENTS

CN 1885314 A 12/2006
CN 100373397 C * 12/2006
(Continued)

OTHER PUBLICATIONS

Mohammed et al., Accurate Pupil Features Extraction Based on New Projection Function, 2009, Computing and Informatics, vol. 29, 2010, pp. 663-680.*
(Continued)

Primary Examiner — Guillermo M Rivera-Martinez
(74) Attorney, Agent, or Firm — Dinsmore & Shohl LLP (57) ABSTRACT This disclosure provides a pupil localization method, a device, an apparatus and a storage medium. The method comprises: preprocessing a pupil image; generating a first projection curve and a second projection curve on horizontal and vertical axes of two-dimensional coordinate axes respectively according to the preprocessed image; determining a first pair of dividing points and a second pair of dividing points on the first projection curve and the second projection curve respectively according to a pre-configured threshold; and determining center coordinates of the pupil according to the first pair of dividing points and the second pair of dividing points. This disclosure obtains projection (Continued)

curves through a simple operation of the preprocessed image on the two-dimensional coordinate axes, and then intercepts the dividing point on the projection curves according to the preconfigured threshold to determine the center coordinates of the pupil.

20 Claims, 8 Drawing Sheets

(51) Int. Cl.

| | | |
|---|---|---|
| *G06T 5/20* | (2006.01) | |
| *G06T 5/00* | (2006.01) | |
| *G06K 9/38* | (2006.01) | |
| *G06K 9/40* | (2006.01) | |

(52) U.S. Cl.
CPC ............... G06T 5/005 (2013.01); G06T 5/20 (2013.01); *G06T 2207/20024* (2013.01)

(56) References Cited

U.S. PATENT DOCUMENTS

| | | | | |
|---|---|---|---|---|
| 6,578,962 | B1* | 6/2003 | Amir | A61B 3/113 345/157 |
| 2006/0110008 | A1* | 5/2006 | Vertegaal | G06T 7/251 382/103 |
| 2006/0147094 | A1* | 7/2006 | Yoo | G06K 9/0061 382/117 |
| 2007/0133879 | A1* | 6/2007 | Fukaya | G06K 9/00604 382/190 |
| 2012/0050516 | A1* | 3/2012 | Tsukizawa | G06K 9/00604 348/78 |
| 2014/0072230 | A1* | 3/2014 | Ruan | G06T 7/12 382/199 |
| 2014/0184496 | A1* | 7/2014 | Gribetz | G02B 27/017 345/156 |
| 2015/0077543 | A1* | 3/2015 | Kerr | H04N 5/2256 348/135 |
| 2015/0098620 | A1* | 4/2015 | Wu | A61B 3/00 382/103 |
| 2015/0281540 | A1* | 10/2015 | Matsuoka | H04N 5/3572 348/362 |
| 2015/0304535 | A1* | 10/2015 | Smits | G06K 9/228 348/78 |
| 2016/0005176 | A1* | 1/2016 | Nguyen | G06K 9/00604 382/103 |
| 2016/0045109 | A1* | 2/2016 | Tsou | A61B 3/0025 351/208 |
| 2017/0188823 | A1* | 7/2017 | Ganesan | G02B 27/0093 |
| 2018/0300589 | A1* | 10/2018 | Levinshtein | G06K 9/6262 |
| 2018/0365844 | A1* | 12/2018 | Cai | G06T 7/248 |
| 2019/0025911 | A1* | 1/2019 | Picard | G06F 3/013 |

FOREIGN PATENT DOCUMENTS

| | | |
|---|---|---|
| CN | 102289824 A | 12/2011 |
| CN | 105678286 A | 6/2016 |
| CN | 106022315 A | 10/2016 |

OTHER PUBLICATIONS

Ketchantang et al., Video Pupil Tracking for Iris Based Identification, 2005, J. Blanc-Talon et al. (Eds.): ACIVS 2005, LNCS 3708, pp. 1-8, 2005.*

First Office Action for CN Appl. No. 201810001231.2, dated Oct. 25, 2019.

* cited by examiner

PUPIL LOCALIZATION METHOD AND DEVICE, APPARATUS, AND STORAGE MEDIUM

CROSS-REFERENCE TO RELATED APPLICATIONS

This application claims priority to Chinese Patent Application No. 201810001231.2 filed on Jan. 2, 2018, which is hereby incorporated by reference in its entirety into this application as a part of this application.

TECHNICAL FIELD

The present invention relates to a pupil localization method and device, an apparatus, and a storage medium.

BACKGROUND

At present, pupil localization algorithms have been widely used, and related pupil localization algorithms have complex algorithmic logic and consume a lot of computing resources.

SUMMARY

This disclosure provides a pupil localization method, comprising:
preprocessing a pupil image;
generating a first projection curve and a second projection curve on horizontal and vertical axes of two-dimensional coordinate axes respectively according to the preprocessed image;
determining a first pair of dividing points and a second pair of dividing points on the first projection curve and the second projection curve respectively according to a pre-configured threshold; and
determining center coordinates of the pupil according to the first pair of dividing points and the second pair of dividing points.

This disclosure provides a pupil localization device, comprising a preprocessing unit, a computing unit, a threshold intercepting unit and a coordinate extracting unit,
wherein the preprocessing unit is configured to preprocess a pupil image;
the computing unit is configured to generate a first projection curve and a second projection curve on horizontal and vertical axes of two-dimensional coordinate axes respectively according to the preprocessed image;
the threshold intercepting unit is configured to determine a first pair of dividing points and a second pair of dividing points on the first projection curve and the second projection curve respectively according to a pre-configured threshold;
the coordinate extracting unit is configured to determine center coordinates of the pupil according to the first pair of dividing points and the second pair of dividing points.

This disclosure further provides an apparatus comprising one or more processors and a memory, wherein the memory contains instructions executable by the one or more processors to cause the one or more processors to perform the pupil localization method provided by various embodiments of this disclosure.

This disclosure further provides a computer readable storage medium on which a computer program is stored, the computer program causing the computer to perform the pupil localization method provided by various embodiments of this disclosure.

BRIEF DESCRIPTION OF THE DRAWINGS

Other features, objectives and advantages of this application will become more apparent by reading the detailed description of the non-limiting embodiments with reference to the following accompanying drawings.

DETAILED DESCRIPTION

This application will be further described in detail below in combination with the accompanying drawings and the embodiments. It can be understood that, the specific embodiments described herein only serve to explain the related disclosure, but are not limitations to this disclosure. It should be further noted that, for the sake of description, only those portions related to this disclosure are shown in the accompanying drawings.

It should be noted that, without conflicts, the embodiments in this application and the features in the embodiments can be combined with each other. This application will be described in detail in the following with reference to the accompanying drawings in combination with the embodiments.

Figure 1:
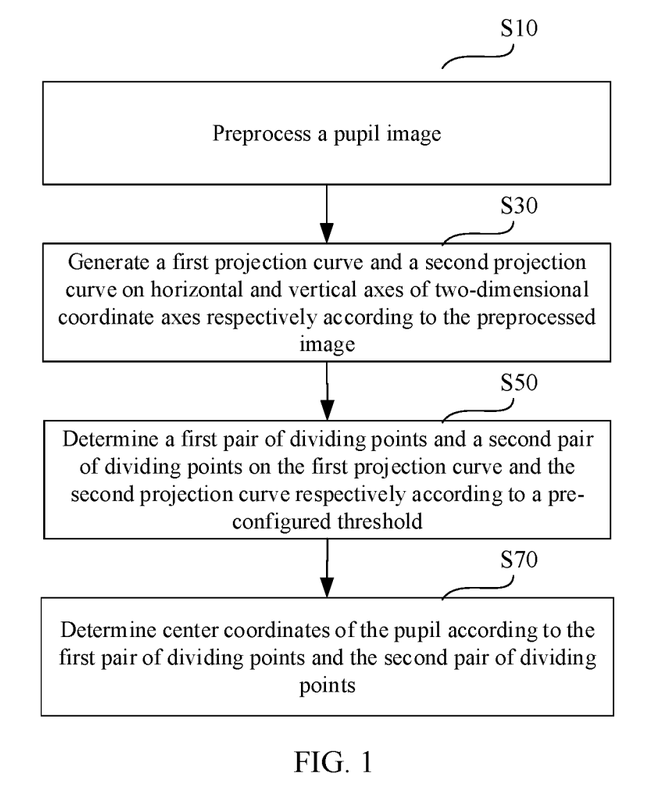
FIG. 1 is a flowchart of a pupil localization method provided by an embodiment of this disclosure.

FIG. 1 is a flowchart of a pupil localization method provided by an embodiment of this disclosure.

As shown in FIG. 1, in this embodiment, this disclosure provides a pupil localization method, comprising:
S10: preprocessing a pupil image;
S30: generating a first projection curve and a second projection curve on horizontal and vertical axes of two-dimensional coordinate axes respectively according to the preprocessed image;
S50: determining a first pair of dividing points and a second pair of dividing points on the first projection curve and the second projection curve respectively according to a pre-configured threshold;

S70: determining center coordinates of the pupil according to the first pair of dividing points and the second pair of dividing points.

Specifically, in the step S10, preprocessing the pupil image is for the purpose of letting a pupil part and other parts in the image present different states, so that in the step S30, the pupil part can be projected onto the two-dimensional coordinate axes through a simple operation. The step S10 and step S30 are described in detail below through the preprocessing and projecting processes shown in FIGS. 2-4.

Figure 2:
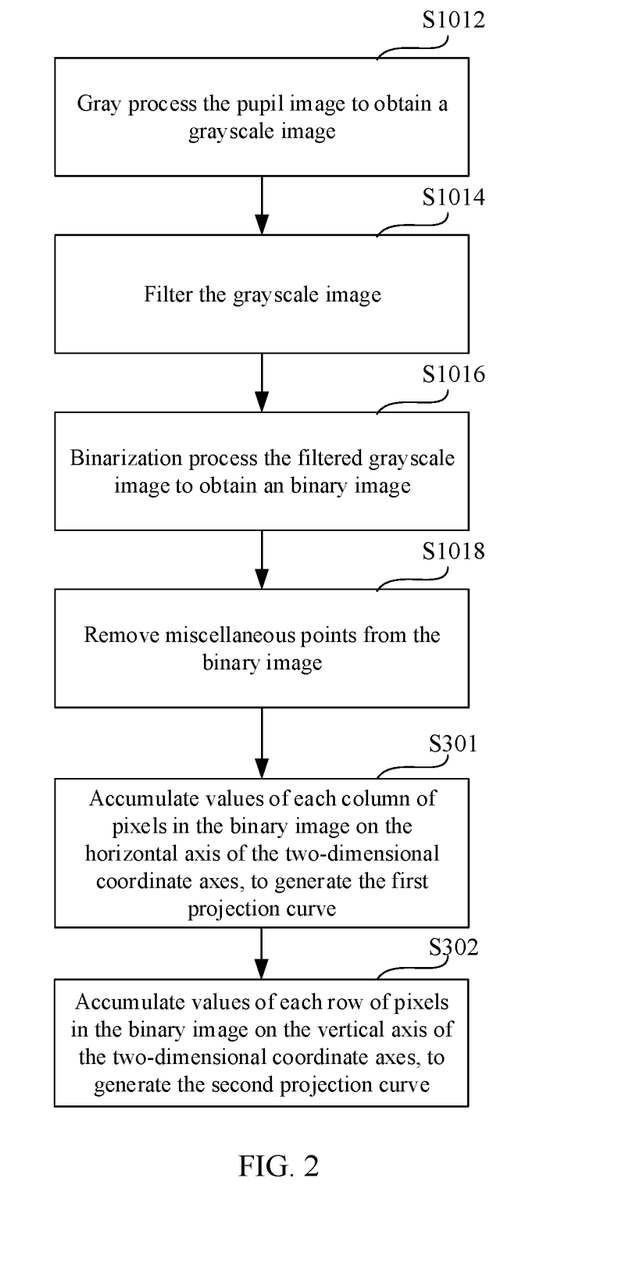
FIG. 2 is a flowchart for the preprocessing and projecting processes in one implementation of the method shown in FIG. 1.

FIG. 2 is a flowchart for the preprocessing and projecting processes in one implementation of the method shown in FIG. 1. As shown in FIG. 2, in an embodiment, the step S10 comprises:

S1012: gray processing the pupil image to obtain a grayscale image;

S1014: filtering the grayscale image;

S1016: binarization processing the filtered grayscale image to obtain an binary image;

S1018: removing miscellaneous points from the binary image.

The step S30 comprises:

S301: accumulating values of each column of pixels in the binary image on the horizontal axis of the two-dimensional coordinate axes, to generate the first projection curve; and S302: accumulating values of each row of pixels in the binary image on the vertical axis of the two-dimensional coordinate axes, to generate the second projection curve.

Specifically, in the step S1012, grayscale is extracted from the pupil image.

In the step S1014, in order to filter out noise, a filtering algorithm with median filtering characteristics is used to filter the grayscale image. Furthermore, in the solution shown in FIG. 5 to be discussed below, in order to match the prediction algorithm, a Gaussian filtering algorithm with both median filtering characteristics and Gaussian characteristics can be used for the filtering.

In the step S1016, the binarization processing specifically comprises: using a pre-configured grayscale threshold for threshold segmentation on the filtered grayscale image; if the grayscale value of a pixel is greater than the grayscale threshold, then the value of the pixel is set to 1 (or 0), otherwise, 0 (or 1). In one or more embodiments, after the completion of the binarization processing, if the value of the pupil part is 0 and the value of the background part is 1, then take a reverse operation, so that the value of the pupil part becomes 1 and the value of the background part becomes 0, for the convenience of subsequent operations. Under an ideal condition, a binary image whose pupil part has a value of 1 and whose background part has a value of 0 can be obtained after the binarization processing. However, in most cases, the pupil part and the background part of the binary image will still have some miscellaneous points, which will affect the accuracy of subsequent localization.

For the pupil image under an ideal condition, or in the case of a low requirement on the localization accuracy, after the completion of the step S1016, the process directly enters the step S30 for accumulative projection. In general, however, these miscellaneous points shall be removed by the step S1018 to improve the localization accuracy.

In the step S1018, this embodiment adopts a corrosion algorithm and an expansion algorithm for removing miscellaneous points. In another embodiment, only the corrosion algorithm is adopted for removing the miscellaneous points. Experiments show that, the use of the corrosion algorithm independently can also satisfy the requirement on localization accuracy and can reduce the computing resources required at the same time.

Figure 3:
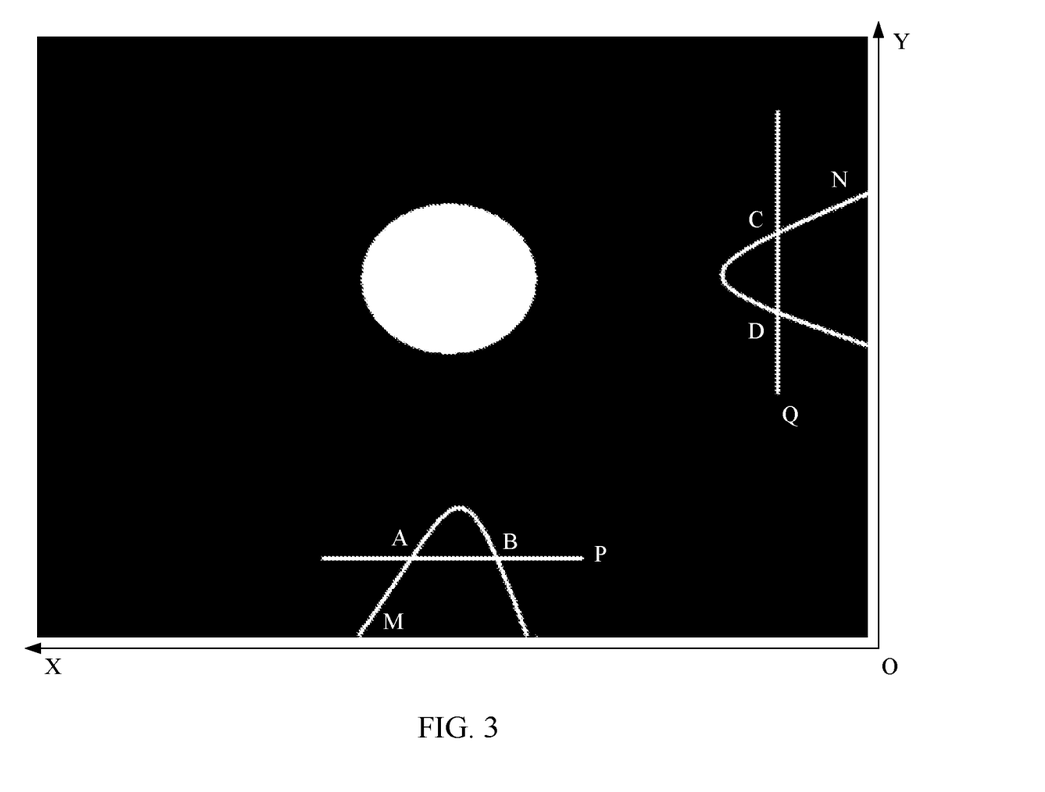
FIG. 3 is a schematic diagram showing projection and interception of dividing points according to the threshold in the method shown in FIG. 2.

FIG. 3 is a schematic diagram showing projection and interception of dividing points according to the threshold in the method shown in FIG. 2. As shown in FIG. 3, in the step S301, values of each column of pixels (the pupil part is 1, and the background part is 0) in the binary image on the horizontal axis X of the two-dimensional coordinate axes are accumulated to obtain the first projection curve M, and in the step S302, and values of each row of pixels in the binary image on the vertical axis Y of the two-dimensional coordinate axes are accumulated to obtain the second projection curve N.

In the step S50, the first pair of dividing points A (x1, y0), B (x2, y0) on the first projection curve M is determined according to the preconfigured horizontal axis threshold y0 (first threshold line P: y=y0), and the second pair of dividing points C (x0, y1), D (x0, y2) on the second projection curve N is determined according to the pre-configured vertical threshold x0 (second threshold line Q: x=x0).

Among them, the horizontal threshold y0 and the vertical axis threshold x0 can be configured depending on experiences, and can also be obtained by training with neural network model.

In the step S70, this embodiment determines the center coordinate of the pupil by means of the calculation method of averaging, namely, X=(x1+x2)/2 and Y=(y1+y2)/2, to obtain and output the pupil center coordinates (X, Y). In more embodiments, the calculation method can be also fine-tuned according to the experimental results, for example, different weights are configured for the coordinates of the dividing points for the left eye and the right eye respectively, different calculation methods are configured according to different ocular types of different human races, and so on.

The embodiment shown in FIG. 2, through binaralization processing of the image in the preprocessing, greatly simplifies the accumulative operation, which further reduces the required computing resources while guaranteeing the localization accuracy, and extends the scope of applications of the pupil localization solution.

Figure 4:
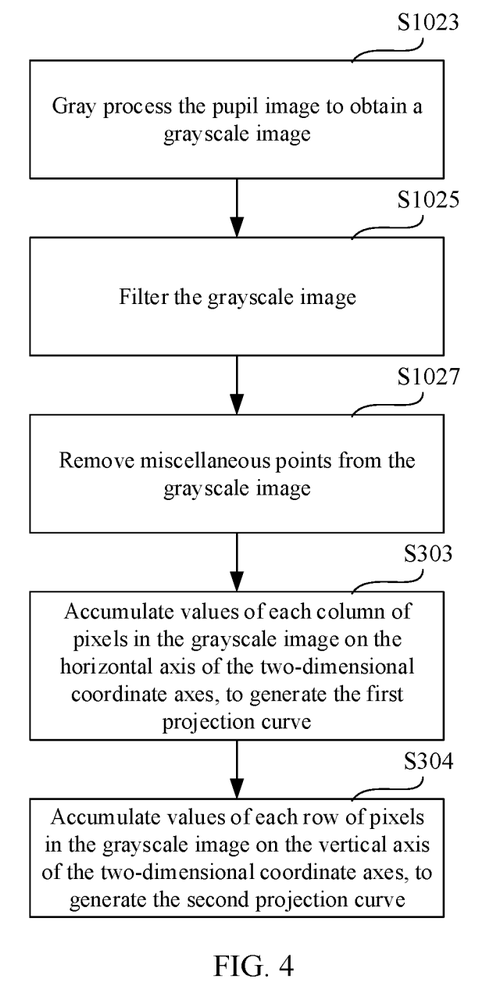
FIG. 4 is a flowchart for the preprocessing and projecting processes in another implementation of the method shown in FIG. 1.

FIG. 4 is a flowchart for the preprocessing and projecting processes in another implementation of the method shown in FIG. 1.

As shown in FIG. 4, in another embodiment, the step S10 comprises:

S1023: gray processing the pupil image to obtain a grayscale image;

S1025: filtering the grayscale image;

S1027: removing miscellaneous points from the grayscale image.

The step S30 comprises:

S303: accumulating values of each column of pixels in the grayscale image on a horizontal axis of the two-dimensional coordinate axes, to generate a first projection curve; and S304: accumulating values of each row of pixels in the grayscale image on a vertical axis of the two-dimensional coordinate axes, to generate a second projection curve.

Specifically, the preprocessing process in this embodiment differs from the preprocessing process shown in FIG. 2 in that, the step of threshold segmentation is omitted and miscellaneous points are directly removed from the grayscale image. Thus, the values accumulated in the projecting process of the step S30 are no longer just 1 and 0, but rather the grayscale values, which retains more details of the image, and makes the localization result more accurate.

Further, before the accumulation of grayscale values in the step S302, operations such as reduction in the same proportion or threshold interception can also be made on the grayscale values, to decrease the value obtained by accumulating the grayscale values, thereby reducing the required computing resources. In addition, an AND operation can be made between the grayscale value of each pixel and binarization processing results of the same frame of images (by making the value of the background part as 0, the need to accumulate the grayscale value of the background part can be thus eliminated while the grayscale value of the pupil part is retained), and then the accumulating operation is made.

The embodiment shown in FIG. 4, by accumulating the grayscale values, the localization accuracy is further improved while the requirement on hardware custom development is met.

In one or more embodiments, the preprocessing process shown in FIG. 2 or FIG. 4 above further comprises: after performing the step S1012 or S1023, exposure compensation on the grayscale image is performed. Specifically, for some pupil images, e.g., pupil images acquired by an infrared camera or a VR eye, the images possibly are dark, resulting in difficulty to distinguish between the pupil part and the background part, so it is needed to perform exposure compensation after gray processing.

Figure 5:
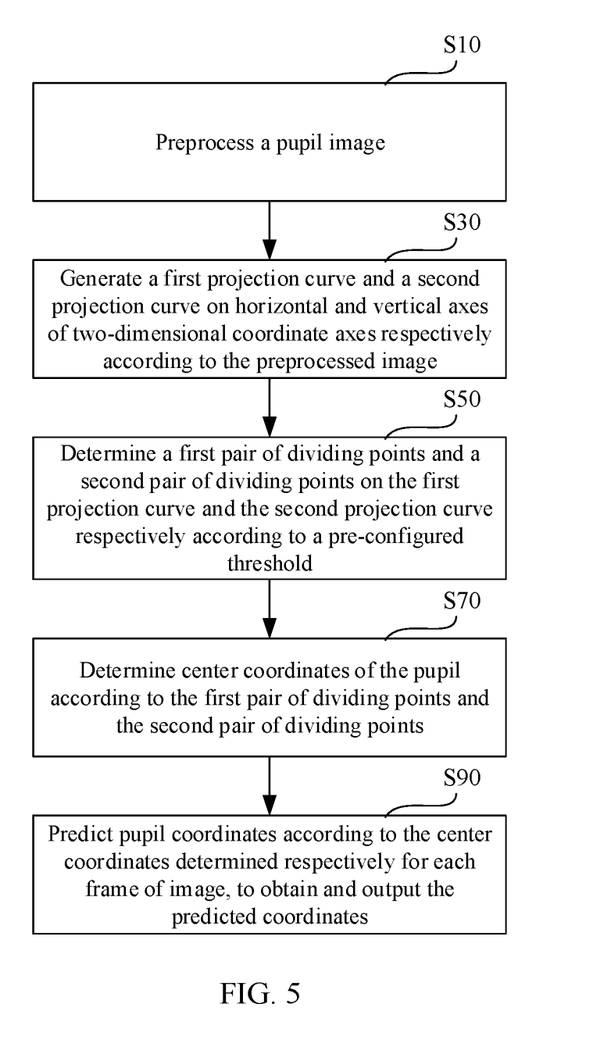
FIG. 5 is a flowchart of one implementation of the method shown in FIG. 1.

FIG. 5 is a flowchart of one implementation of the method shown in FIG. 1. As shown in FIG. 5, in one embodiment, the pupil image comprises at least two frames of image, and the above method further comprises:

S90: predicting pupil coordinates according to the center coordinates determined respectively for each frame of image, to obtain and output the predicted coordinates.

Specifically, a single frame of image only characterizes the pupil location at the moment when the image is acquired, so the pupil center coordinates obtained according to the localization of a single frame of image sometimes cannot accurately characterize the current location of the pupil, leading to inaccurate localization.

By locating multiple frames of image respectively, and predicting the center coordinates obtained by respectively locating each frame of image using a Kalman filtering algorithm to obtain the predicted coordinates, this embodiment can locate the current location of the pupil more accurately. Specifically, a process model is created based on the Kalman filtering algorithm, the center coordinates is input into the process model as a set of measurement values to predict a next state, and generate a predicted value, and then an optimal prediction value is generated according to the predicted value and the measurement value in the latest state and output as the predicted coordinates.

In more embodiments, other location prediction algorithms commonly used in the art can also be adopted to predict the current location of the pupil according to the center coordinates.

In one or more embodiments, when the predictive algorithm in the step S90 uses the Kalman filtering algorithm, the filtering process in the step S10 uses the Gaussian filtering algorithm to obtain more accurate prediction results.

The embodiment shown in FIG. 5, by respectively extracting the center coordinates of the pupil for the multiple frames of image and performing coordinate prediction according to the center coordinates, further improves the localization accuracy while the requirement on hardware custom development is met.

Figure 6:
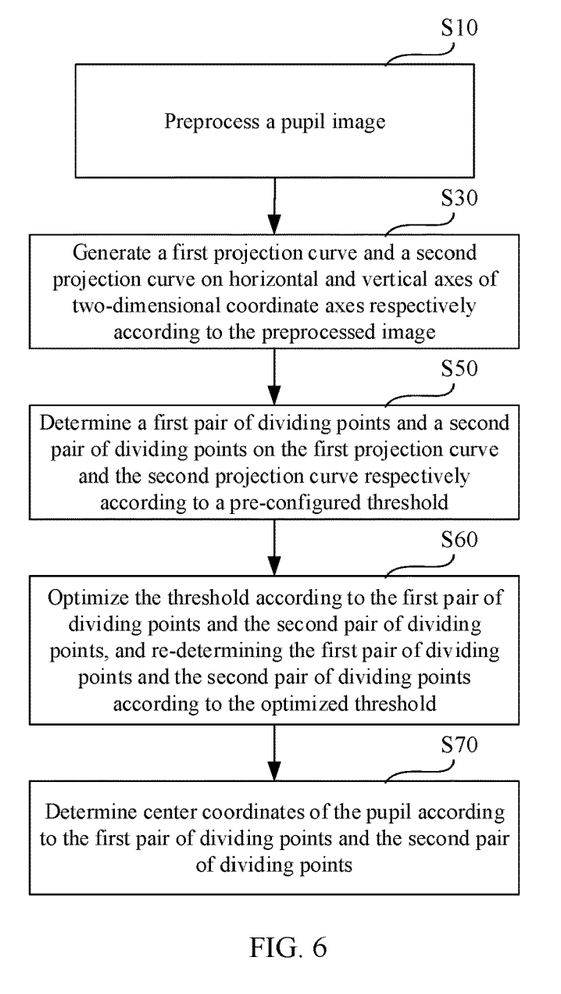
FIG. 6 is a flowchart of one implementation of the method shown in FIG. 1.

FIG. 6 is a flowchart of one implementation of the method shown in FIG. 1. As shown in FIG. 6, in one embodiment, the above method further comprises:

S60: optimizing the threshold according to the first pair of dividing points and the second pair of dividing points, and re-determining the first pair of dividing points and the second pair of dividing points according to the optimized threshold.

Specifically, when the threshold is improperly configured, problems will occur such as inability to intercept any dividing point, interception of only one dividing point but not a pair of dividing points, a too short distance between the intercepted dividing points, which results in problems such as inability to complete the localization or inaccurate localization.

In the above cases, in the step S60, by determining whether or not to optimize the threshold according to the intercepted dividing point and re-determining the dividing points, the completion of the localization is guaranteed, which prevents the improper configuration of the threshold from affecting the localization accuracy.

The embodiment shown in FIG. 6, by optimizing the threshold according to the intercepted dividing point when the threshold interception results are not ideal, and re-determining the dividing points according to the optimized threshold, can guarantee the completion of localization through automatic optimization when the threshold setting is inappropriate, which improves the reliability of the pupil localization solution.

Figure 7:
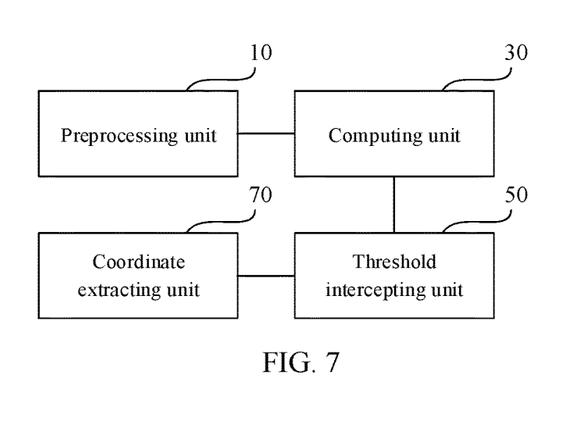
FIG. 7 is a schematic diagram showing a structure of a pupil localization device provided by an embodiment of this disclosure.

FIG. 7 is a schematic diagram showing a structure of a pupil localization device provided by an embodiment of this disclosure. The device shown in FIG. 7 can correspondingly execute the method shown in FIG. 1.

As shown in FIG. 7, this disclosure provides a pupil localization device, comprising a preprocessing unit 10, a computing unit 30, a threshold intercepting unit 50 and a coordinate extracting unit 70, wherein the preprocessing unit 10 is configured to preprocess a pupil image;

the computing unit 30 is configured to generate a first projection curve and a second projection curve on horizontal and vertical axes of two-dimensional coordinate axes respectively according to the preprocessed image;

the threshold intercepting unit 50 is configured to determine a first pair of dividing points and a second pair of dividing points on the first projection curve and the second projection curve respectively according to a pre-configured threshold;

the coordinate extracting unit 70 is configured to determine center coordinates of the pupil according to the first pair of dividing points and the second pair of dividing points.

Specifically, in one embodiment, the pupil localization device is an integrated IC (IC) chip integrally integrated, and in another embodiment, the pupil localization device is an field programmable gate array (FPGA) chip integrally integrated. In more embodiments, the pupil localization device can also be configured as any hardware device that could be understood by those skilled in the art or a combination thereof.

The pupil localization principle of the device shown in FIG. 7 can be understood by referring to the method shown in FIG. 1, and is omitted here.

Figure 8:
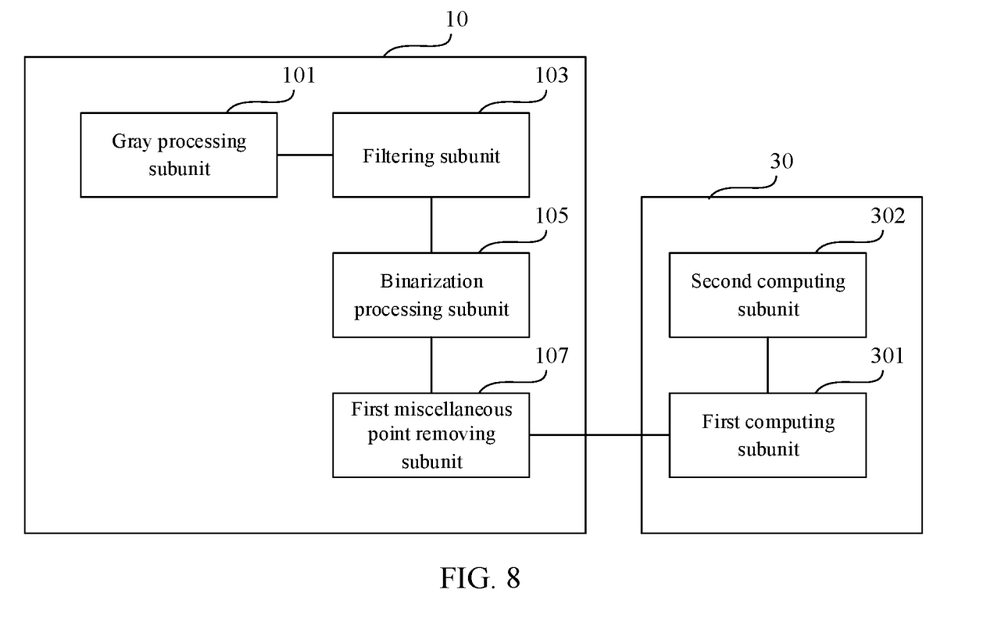
FIG. 8 is a schematic diagram showing a structure of the preprocessing unit in one implementation of the device shown in FIG. 7.

FIG. 8 is a schematic diagram showing a structure of the preprocessing unit in one implementation of the device shown in FIG. 7. The device shown in FIG. 8 can correspondingly execute the method shown in FIG. 2.

As shown in FIG. 8, in an embodiment, the preprocessing unit 10 comprises a gray processing subunit 101, a filtering subunit 103, a binarization processing unit 105 and a first miscellaneous point removing subunit 107, wherein the gray processing subunit 101 is configured to gray process the pupil image to obtain a grayscale image;

the filtering subunit 103 is configured to filter the grayscale image;

the binarization processing unit 105 is configured to binarization process the filtered grayscale image to obtain an binary image;

the first miscellaneous point removing subunit 107 is configured to remove miscellaneous points from the binary image.

The computing unit 30 comprises a first computing subunit 301 and a second computing subunit 302, wherein the first computing subunit 301 is configured to accumulate values of each column of pixels in the binary image on the horizontal axis of the two-dimensional coordinate axes, to generate the first projection curve;

the second computing subunit 302 is configured to accumulate values of each row of pixels in the binary image on the vertical axis of the two-dimensional coordinate axes, to generate the second projection curve.

The preprocessing and projecting principle of the device shown in FIG. 8 can be understood by referring to the method shown in FIG. 2, and is omitted here.

Figure 9:
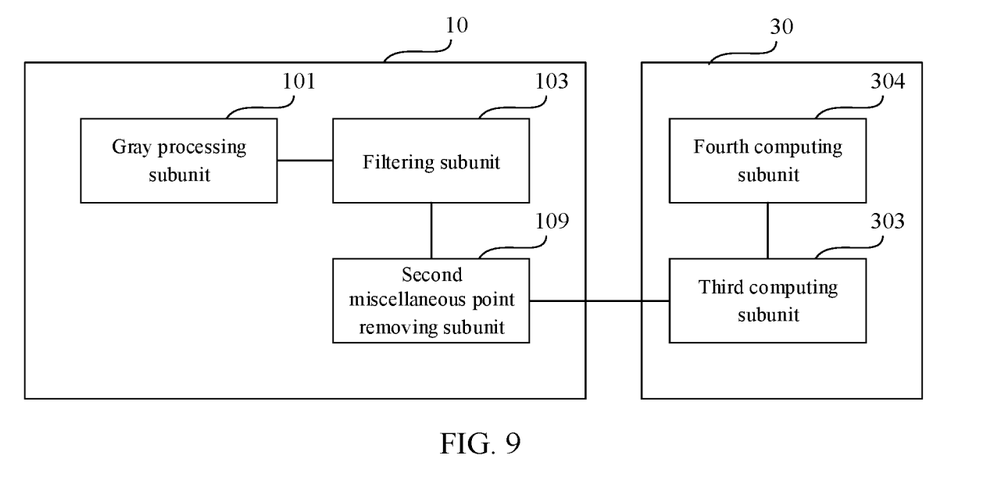
FIG. 9 is a schematic diagram showing a structure of the preprocessing unit in another implementation of the device shown in FIG. 7.

FIG. 9 is a schematic diagram showing a structure of the preprocessing unit in another implementation of the device shown in FIG. 7. The device shown in FIG. 9 can correspondingly execute the method shown in FIG. 4.

As shown in FIG. 9, in an embodiment, the preprocessing unit 10 comprises a gray processing subunit 101, a filtering subunit 103, and a second miscellaneous point removing subunit 109, wherein the gray processing subunit 101 is configured to gray process the pupil image to obtain a grayscale image;

the filtering subunit 103 is configured to filter the grayscale image;

the second miscellaneous point removing subunit 109 is configured to remove miscellaneous points from the grayscale image.

The computing unit 30 comprises a third computing subunit 303 and a fourth computing subunit 304, wherein the third computing subunit 303 is configured to accumulate values of each column of pixels in the grayscale image on a horizontal axis of the two-dimensional coordinate axes, to generate a first projection curve;

the fourth computing subunit 304 is configured to accumulate values of each row of pixels in the grayscale image on a vertical axis of the two-dimensional coordinate axes, to generate a second projection curve.

The preprocessing and projecting principle of the device shown in FIG. 9 can be understood by referring to the method shown in FIG. 4, and is omitted here.

Figure 10:
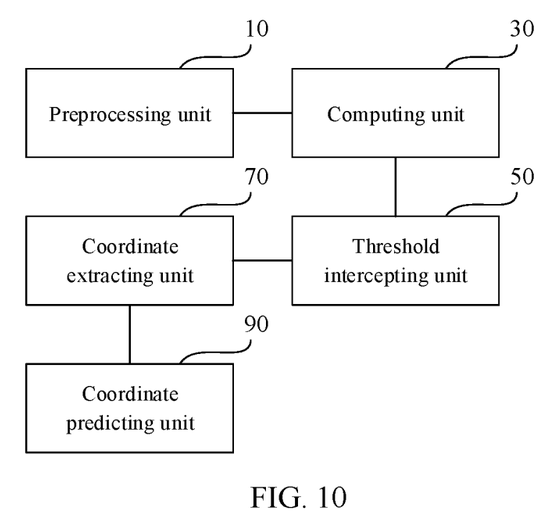
FIG. 10 is a schematic diagram showing a structure of one implementation of the device shown in FIG. 7.

FIG. 10 is a schematic diagram showing a structure of one implementation of the device shown in FIG. 7. The device shown in FIG. 10 can correspondingly execute the method shown in FIG. 5.

As shown in FIG. 10, in an embodiment, the pupil image comprises at least two frames of image, and the pupil localization device further comprises a coordinate predicting unit 90.

The coordinate predicting unit 90 is configured to predict the pupil coordinates according to the center coordinates respectively determined according to each frame of image, to obtain and output the predicted coordinates.

The coordinate predicting principle of the device shown in FIG. 10 can be understood by referring to the method shown in FIG. 5, and is omitted here.

In an embodiment, the pupil localization device further comprises a threshold optimizing unit configured to optimize the threshold according to the first pair of dividing points and the second pair of dividing points, for the threshold intercepting unit 50 to re-determine the first pair of dividing points and the second pair of dividing points according to the optimized threshold. The specific optimization principle can be understood by referring to the method shown in FIG. 6 and is omitted here.

The above embodiments, by obtaining projection curves through a simple accumulative operation of the preprocessed image on the two-dimensional coordinate axes, and then intercepting the dividing point on the projection curves according to the preconfigured threshold to determine the center coordinates of the pupil, achieves accurate pupil localization with a very simple operation, only requires a very small amount of computing resources for localization, and thus satisfies the requirement on hardware custom development.

Figure 11:
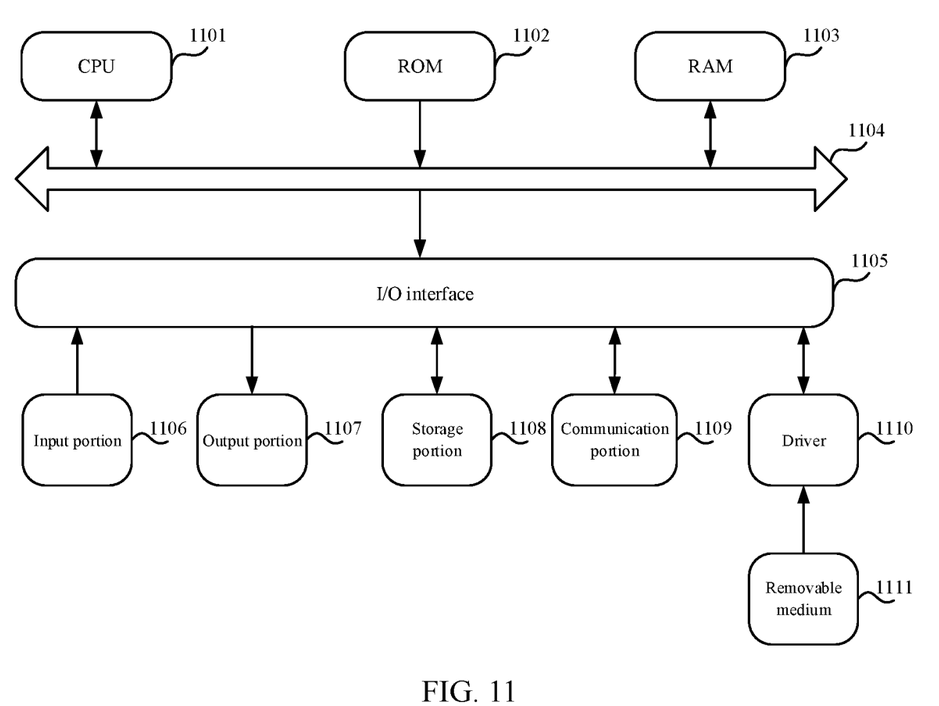
FIG. 11 is a schematic diagram showing a structure of an apparatus provided according to an embodiment of this disclosure.

FIG. 11 is a schematic diagram showing a structure of an apparatus provided by one embodiment of this disclosure.

As shown in FIG. 11, as another aspect, this application further provides an apparatus 1100, comprising one or more central processing unit (CPU) 1101, which can execute a variety of appropriate actions and processes according to the program stored in a read-only memory (ROM) 1102 or the program loaded from a storage portion 1108 into a random access memory (RAM) 1103. In RAM 1103, there also store various programs and data required for the operation of the apparatus 1100. CPU 1101, ROM 1102, and RAM 1103 are connected to one another via a bus 1104. An input/output (I/O) interface 1105 is also connected to the bus 1104.

The following components are connected to the I/O interface 1105: an input portion 1106 including keyboard, mouse and etc.; an output portion 1107 including cathode ray tube (CRT), liquid crystal display (LCD) and a speaker and etc.; a storage portion 1108 including a hard disk and etc.; and a communication portion 1109 including a network interface card such as LAN card, modem etc. The communication portion 1109 performs communication processing over a network such as Internet. A driver 1110 is also connected to the I/O interface 1105 as needed. A removable medium 1111, such as magnetic disc, optical disc, magneto optical disc, semiconductor memory, are installed on the driver 1110 as needed, so that the computer program read from it is loaded into the storage portion 1108 as needed.

In particular, according to an embodiment of this disclosure, the pupil localization method described in any of the above embodiments can be implemented as a computer software program. For example, an embodiment of this disclosure comprises a computer program product comprising a computer program that is tangibly contained on a machine-readable medium, the computer program containing a program code for performing the pupil localization method. In such an embodiment, the computer program can be downloaded and installed from the network through the communication portion 1109, and/or installed from the removable medium 1111.

As a further aspect, this application further provides a computer readable storage medium, and the computer readable storage medium can be the computer-readable storage medium contained in the device according to the above embodiments, or can be a computer-readable storage medium that is separate, and not assembled into the apparatus. The computer-readable storage medium stores one or more programs that are used by one or more processors to perform the pupil localization method described in this application.

The flowcharts and block diagrams in the drawings illustrate possible architectures, functions and operations of the systems, methods and computer program products according to the various embodiments of this disclosure. At this point, each block in the flowchart or block diagram can represent a module, a program segment, or a part of code that contains one or more executable instructions for implementing the prescribed logical functions. It should also be noted that in some implementations as an alternative, the functions labelled in the block can also occur in a different order than those in the drawings. For example, two consecutive blocks can actually be executed essentially in parallel, or sometimes in a reverse order, depending on the functionality involved. It should be also noted that each block in the block diagram and/or flowchart, as well as a combination of blocks in the block diagram and/or flowchart, can be implemented by a dedicated hardware-based system that performs the prescribed functions or operations, or through a combination of dedicated hardware and computer instructions.

The units or modules described in the embodiments of this application can be implemented by means of software or hardware. The units or modules described can also be arranged in the processor, for example, the units can be software programs arranged in a computer or mobile intelligent device, or can be a separately configured hardware device, wherein the names of these units or modules in some cases do not constitute limitations to the units or the modules themselves.

The above description is merely a description of advantageous embodiments in this application and the technical principles applied. Those skilled in the art shall understand that the scope of the disclosure involved in this application is not limited to the technical solution of a particular combination of the above technical features, and that it shall also cover other technical solutions formed by any combination of the above technical features or their equivalent features without departing from the concept of this application, for example, a technical solution formed by interchanging the above features with the technical features disclosed in this application (but not limited thereto) with similar functions.

What is claimed is:

1. A pupil localization method, comprising:
 preprocessing a pupil image;
 generating a first projection curve and a second projection curve on horizontal and vertical axes of two-dimensional coordinate axes respectively according to the preprocessed image;
 determining a first pair of dividing points and a second pair of dividing points on the first projection curve and the second projection curve respectively according to a pre-configured threshold; and
 determining center coordinates of the pupil according to the first pair of dividing points and the second pair of dividing points;
 wherein the pre-configured threshold comprises a preconfigured horizontal axis threshold and a pre-configured vertical threshold,
 said determining a first pair of dividing points and a second pair of dividing points on the first projection curve and the second projection curve respectively according to a pre-configured threshold comprises determining the first pair of dividing points on the first projection curve according to the preconfigured horizontal axis threshold, and determining the second pair of dividing points on the second projection curve according to the pre-configured vertical threshold, and
 said determining center coordinates of the pupil according to the first pair of dividing points and the second pair of dividing points comprises determining a horizontal coordinate of a center of the pupil based on an average of horizontal coordinates of the first pair of dividing points and determining a vertical coordinate of the center of the pupil based on an average of vertical coordinates of the second pair of dividing points.

2. The method according to claim 1, wherein preprocessing a pupil image comprises:
 gray processing the pupil image to obtain a grayscale image;
 filtering the grayscale image;
 binarization processing the filtered grayscale image to obtain an binary image; and
 removing miscellaneous points from the binary image;
 wherein generating a first projection curve and a second projection curve on horizontal and vertical axes of two-dimensional coordinate axes respectively according to the preprocessed image comprises:
 accumulating values of each column of pixels in the binary image on the horizontal axis of the two-dimensional coordinate axes, to generate the first projection curve; and
 accumulating values of each row of pixels in the binary image on the vertical axis of the two-dimensional coordinate axes, to generate the second projection curve.

3. The method according to claim 1, wherein preprocessing a pupil image comprises:
 gray processing the pupil image to obtain a grayscale image;
 filtering the grayscale image; and
 removing miscellaneous points from the grayscale image;
 wherein generating a first projection curve and a second projection curve on horizontal and vertical axes of two-dimensional coordinate axes respectively according to the preprocessed image comprises:
 accumulating values of each column of pixels in the grayscale image on the horizontal axis of the two-dimensional coordinate axes, to generate the first projection curve; and
 accumulating values of each row of pixels in the grayscale image on the vertical axis of the two-dimensional coordinate axes, to generate the second projection curve.

4. The method according to claim 1, further comprising:
 optimizing the threshold according to the first pair of dividing points and the second pair of dividing points, and re-determining the first pair of dividing points and the second pair of dividing points according to the optimized threshold.

5. The method according to claim 1, wherein the pupil image comprises at least two frames of image, and the method further comprises:
 predicting pupil coordinates according to the center coordinates determined respectively for each frame of image, to obtain and output the predicted coordinates.

6. The method according to claim 5, wherein the pupil coordinates are predicted using a Kalman filtering algorithm.

7. The method according to claim 2, wherein the filtering process adopts a Gaussian filtering algorithm.

8. The method according to claim 3, wherein the filtering process adopts a Gaussian filtering algorithm.

9. The method according to claim 2, wherein preprocessing a pupil image further comprises:
performing an exposure compensation on the grayscale image.

10. The method according to claim 3, wherein preprocessing a pupil image further comprises:
performing an exposure compensation on the grayscale image.

11. The method according to claim 2, wherein a corrosion algorithm and/or an expansion algorithm are/is adopted for removing miscellaneous points.

12. The method according to claim 3, wherein a corrosion algorithm and/or an expansion algorithm are/is adopted for removing miscellaneous points.

13. An apparatus comprising:
one or more processors; and
a memory for storing one or more programs,
wherein the one or more programs, when executed by the one or more processors, causes the one or more processors to perform following processes:
preprocessing a pupil image;
generating a first projection curve and a second projection curve on horizontal and vertical axes of two-dimensional coordinate axes respectively according to the preprocessed image;
determining a first pair of dividing points and a second pair of dividing points on the first projection curve and the second projection curve respectively according to a pre-configured threshold; and
determining center coordinates of the pupil according to the first pair of dividing points and the second pair of dividing points;
wherein the pre-configured threshold comprises a preconfigured horizontal axis threshold and a pre-configured vertical threshold,
said determining a first pair of dividing points and a second pair of dividing points on the first projection curve and the second projection curve respectively according to a pre-configured threshold comprises determining the first pair of dividing points on the first projection curve according to the preconfigured horizontal axis threshold, and determining the second pair of dividing points on the second projection curve according to the pre-configured vertical threshold, and
said determining center coordinates of the pupil according to the first pair of dividing points and the second pair of dividing points comprises determining a horizontal coordinate of a center of the pupil based on an average of horizontal coordinates of the first pair of dividing points and determining a vertical coordinate of the center of the pupil based on an average of vertical coordinates of the second pair of dividing points.

14. The apparatus according to claim 13, wherein the processors are further configured to perform following processes so as to preprocess the pupil image:
gray processing the pupil image to obtain a grayscale image;
filtering the grayscale image;
binarization processing the filtered grayscale image to obtain an binary image; and
removing miscellaneous points from the binary image;
wherein generating a first projection curve and a second projection curve on horizontal and vertical axes of two-dimensional coordinate axes respectively according to the preprocessed image comprises:
accumulating values of each column of pixels in the binary image on the horizontal axis of the two-dimensional coordinate axes, to generate the first projection curve; and
accumulating values of each row of pixels in the binary image on the vertical axis of the two-dimensional coordinate axes, to generate the second projection curve.

15. The apparatus according to claim 13, wherein the processors are further configured to perform following processes so as to preprocess the pupil image:
gray processing the pupil image to obtain a grayscale image;
filtering the grayscale image; and
removing miscellaneous points from the grayscale image;
wherein generating a first projection curve and a second projection curve on horizontal and vertical axes of two-dimensional coordinate axes respectively according to the preprocessed image comprises:
accumulating values of each column of pixels in the grayscale image on the horizontal axis of the two-dimensional coordinate axes, to generate the first projection curve; and
accumulating values of each row of pixels in the grayscale image on the vertical axis of the two-dimensional coordinate axes, to generate the second projection curve.

16. The apparatus according to claim 13, wherein the processors are further configured to perform following processes:
optimizing the threshold according to the first pair of dividing points and the second pair of dividing points, and re-determining the first pair of dividing points and the second pair of dividing points according to the optimized threshold.

17. The apparatus according to claim 13, wherein the pupil image comprises at least two frames of image, and the processors are further configured to perform following processes:
predicting pupil coordinates according to the center coordinates determined respectively for each frame of image, to obtain and output the predicted coordinates.

18. The apparatus according to claim 14, wherein the processors are further configured to perform following process:
performing an exposure compensation on the grayscale image.

19. The apparatus according to claim 15, wherein the processors are further configured to perform following process:
performing an exposure compensation on the grayscale image.

20. A storage medium on which a computer program is stored, the program, when executed by one or more processors, causes the one or more processors to perform following processes:
preprocessing a pupil image;
generating a first projection curve and a second projection curve on horizontal and vertical axes of two-dimensional coordinate axes respectively according to the preprocessed image;
determining a first pair of dividing points and a second pair of dividing points on the first projection curve and the second projection curve respectively according to a pre-configured threshold; and determining center coordinates of the pupil according to the first pair of dividing points and the second pair of dividing points;

wherein the pre-configured threshold comprises a pre-configured horizontal axis threshold and a pre-configured vertical threshold, said determining a first pair of dividing points and a second pair of dividing points on the first projection curve and the second projection curve respectively according to a pre-configured threshold comprises determining the first pair of dividing points on the first projection curve according to the preconfigured horizontal axis threshold, and determining the second pair of dividing points on the second projection curve according to the pre-configured vertical threshold, and said determining center coordinates of the pupil according to the first pair of dividing points and the second pair of dividing points comprises determining a horizontal coordinate of a center of the pupil based on an average of horizontal coordinates of the first pair of dividing points and determining a vertical coordinate of the center of the pupil based on an average of vertical coordinates of the second pair of dividing points.

* * * * *